United States Patent [19]

Boella et al.

[11] Patent Number: 4,496,835

[45] Date of Patent: Jan. 29, 1985

[54] SHAFT ENCODER WITH DIFFUSELY PLACED LIGHT SENSITIVE ELEMENTS

[75] Inventors: Marcello Boella, Loranzè ; Paolo Rivera, Strambino, both of Italy

[73] Assignee: Ing. C. Olivetti & C., S.p.A., Ivrea, Italy

[21] Appl. No.: 388,699

[22] Filed: Jun. 15, 1982

[30] Foreign Application Priority Data

Jun. 15, 1981 [IT] Italy ............... 67821 A/81

[51] Int. Cl.³ ............................................... G01D 5/34
[52] U.S. Cl. ............................ 250/231 SE; 340/347 P
[58] Field of Search ............... 340/347 P; 250/237 G, 250/231 SE, 578; 356/395

[56] References Cited

U.S. PATENT DOCUMENTS 3,549,897 12/1970 Blake ............................ 250/231 SE
4,319,134 3/1982 Weber ........................... 250/231 SE

FOREIGN PATENT DOCUMENTS

57-169612 10/1982 Japan ............................... 250/237 G
769587 7/1980 U.S.S.R. ............................ 340/347 P Primary Examiner—David C. Nelms
Assistant Examiner—J. Brophy
Attorney, Agent, or Firm—Banner, Birch, McKie & Beckett

[57] ABSTRACT

An optical transducer for detecting the angular position of a rotary member with respect to a fixed structure comprises a disc 13 mounted rotatably within a casing. The disc is provided with a plurality of opaque radial regions 19 which are spaced by transparent regions 18 which transmit the light emitted by a light source mounted on the casing. The light is received by a photodetector element 25 comprising a support plate 28 on which is disposed a multiplicity of photovoltaic cells 26 each having an area which is fraction of the area of each transparent region of the disc. The cells are subdivided into the groups A, B and C with different functions and phase positions and are distributed diffusely over the area encountered by the beam of light from the light source. The cells of each group are connected together in parallel to generate three electrical signals, one of which provides pilot control for the feed to the light source to stabilize the signals of the other two groups of photoelectric cells.

13 Claims, 7 Drawing Figures

SHAFT ENCODER WITH DIFFUSELY PLACED LIGHT SENSITIVE ELEMENTS

BACKGROUND AND SUMMARY OF THE INVENTION

The present invention relates to an optical transducer for detecting the position of a movable member with respect to a fixed structure, comprising a light source, a photodetector and a shutter member which is provided with a plurality of interruption regions for interrupting the light, spaced by transmission regions which selectively transmit the light emitted by the light source to the photodetector in response to the movement of the movable member.

One use of such a transducer which may be mentioned by way of example is in relation to the shaft of a motor which provides for selection of the characters of a character-carrying element of an office typewriter or which produces movement of the character-carrying element with respect to a line of type. In that type of transducer, the movable member unambiguously determines the relative position as between the shutter member and the assembly formed by the light source and the photodetector, and causes illumination of the photodetector, which varies in dependence on the movement of the movable member. In response to illumination thereof, the photodetector in turn produces a signal which indicates the position of the movable member. In order to have sufficiently accurate information, the output signal must have a fairly high level and thus dimensions of the photodetector cannot be too small. Moreover any variations in response by the photodetector are detected as variations in the position of the movable member, so that the accuracy of the transducer directly depends on the stability of the photodetector and the illuminating means in regard to external disturbances or variation in time in respect of the characteristics of the various electrical-optical components.

A position transducer is known which comprises a shutter member in the form of a disc which has apertures or notches at its periphery and which is connected to a rotary member, a photodiode which illuminates a notched sector of the disc, and a mask provided with four regions which are provided with a series of apertures or notches corresponding to those of the disc. The apertures or notches of the four regions are out of phase relative to each other by a quarter of a pitch and selectively transmit the light from the apertures or notches of the disc to four photosensitive elements. The output signals of the photosensitive elements are used, in pairs in phase opposition, to produce two positional signals which in turn are out-of-phase by a quarter of a cycle. A part of the light emitted by the photodiode which passes by the periphery of the disc is detected by a further photodetector which provides pilot control for a circuit for stabilising the photodiode itself. Such a transducer has been found to be fairly accurate. However, during production and depending on the characteristics of the individual components, the transducer requires accurate and expensive individual calibration of the circuits associated therewith for adjusting the signals of the photodetectors to the level envisaged by the design. In the course of service moreover, the variations in distribution of the light flux or the variations in characteristics of any of the five sensitive elements which are disposed on various areas of the cone of illumination of the photodiode give rise to a positional error which cannot be corrected except by replacing the entire transducer.

The object of the present invention is to provide a simple and economical transducer which provides positional information which is subjected to the minimum influence of the electrical-optical characteristics of the components employed.

In accordance with a first feature of the invention, the transducer according to the invention comprises a multiplicity of sensitive elements each having an area which is a fraction of the area of each transmission region of the shutter member and the sensitive elements are distributed diffusely in the area encountered by the beam of light issuing from the transmission regions of the shutter member.

In accordance with a second feature, the transducer comprises at least one position detector having a phase relationship which is variable in dependence on the movement of the movable member, with respect to the transmission regions of the shutter member, and a series of photosensitive elements which are disposed in the immediate vicinities of the position detector and which are distributed diffusely in the area encountered by the beam of light issuing from the transmission regions of the shutter member and in which each photosensitive element has an individually different phase relationship with respect to said transmission regions and is connected to the other photosenstitive elements of the series thereby to generate a stabilisation signal for the light source which is substantially independent of the position of the movable member.

DESCRIPTION OF THE DRAWING

These and other features of the invention will be clearly apparent from the following description of preferred embodiments given by way of non-limiting example, with reference to the accompanying drawings in which.

DESCRIPTION OF A PREFERRED EMBODIMENT

Figure 1:
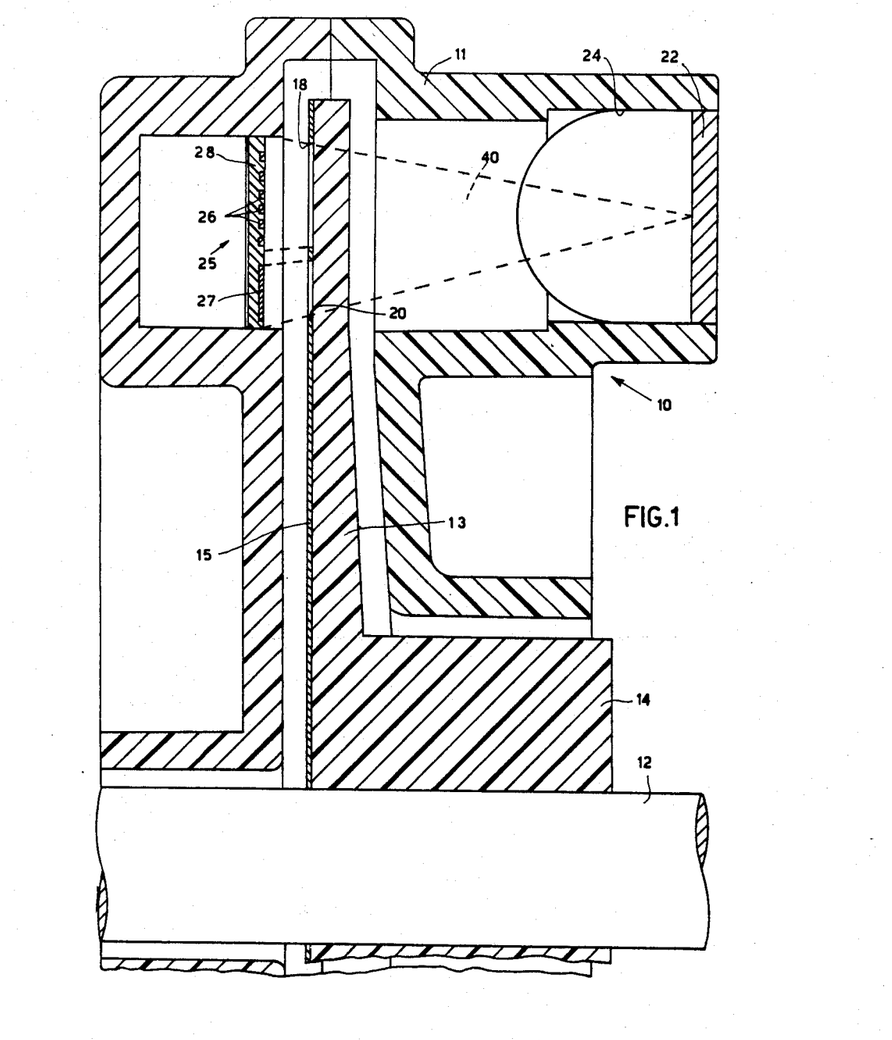
FIG. 1 is a view in cross section of part of an optical transducer according to the invention.

Referring to FIG. 1, an optical transducer 10 according to the invention comprises a casing 11 for example of plastics material, which is of substantially parallelepiped shape, with a shaft 12 disposed rotatably therewithin. The structure of the casing 11 may be of any known type, for example of the type described in our published patent application GB No. 2,062,220.

Figure 2:
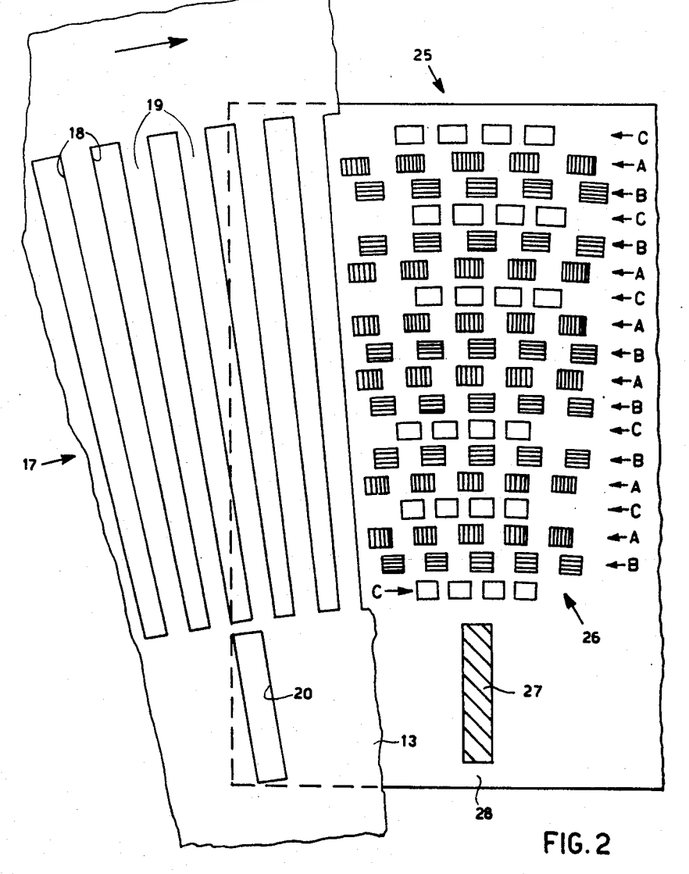
FIG. 2 is a front view on an enlarged scale of parts of the FIG. 1 arrangement, in a first operating position.

A disc 13 of transparent material such as plastics or glass is fixed to the shaft 12 by means of a hub portion 14. A front surface of the disc 13 is covered with a layer 15 of opaque material, having a substantially peripheral circular ring 17 (see FIGS. 2 and 3), in which are formed a plurality of transparent radial regions 18 which are equally spaced from each other and which are such as to define opaque regions 19 spaced from each other by the transparent regions 18. Also disposed in the layer 15 is a single transparent region 20 which is disposed further inwardly than the regions 18. The region 20 is wider than the regions 18, has its edges out-of-phase with respect to the edges of the regions 18, and performs the function of a synchronisation means. Alternatively, the disc 13 may be completely opaque and may be provided, at the position of the transparent regions 18, with corresponding apertures for the passage of light rays.

In the particular embodiment described herein, there are one hundred transparent regions 18, and the mean width thereof, which is equal to half the pitch, is about 0.5 mm. It will be appreciated that such data are given purely by way of indication and that such parameters may be completely different in other embodiments and for different purposes.

A light source 22 (see FIG. 1) which is formed for example by a photodiode is disposed in a housing portion 24 of the casing 11, which is disposed in front of a small sector of the circular ring 17 of the disc 13.

Disposed opposite to the light source 22 and supported by the casing 11 is a light detector 25 which is formed by a plurality of photovoltaic cells 26 capable of co-operating with the transparent regions 18 and a single photovoltaic cell 27 capable of co-operating with the region 20, all the photovoltaic cells being disposed on a base plate 28. The form and displacement of the various photovoltaic cells 26 and the electrical connection thereof is one aspect of the invention and will now be described in detail hereinafter.

Each photovoltaic cell 26 (see FIG. 2) has a long side which is equal to the width of each region 18, that is to say, about 0.5 mm, and a short side which is about 0.35 mm in length, so as to define a photosensitive area of about 0.175 mm$^2$. It will be appreciated that this is an average value in that, the regions 18 being radial, the width thereof is greater towards the periphery and smaller towards the centre of the disc.

Figure 4:
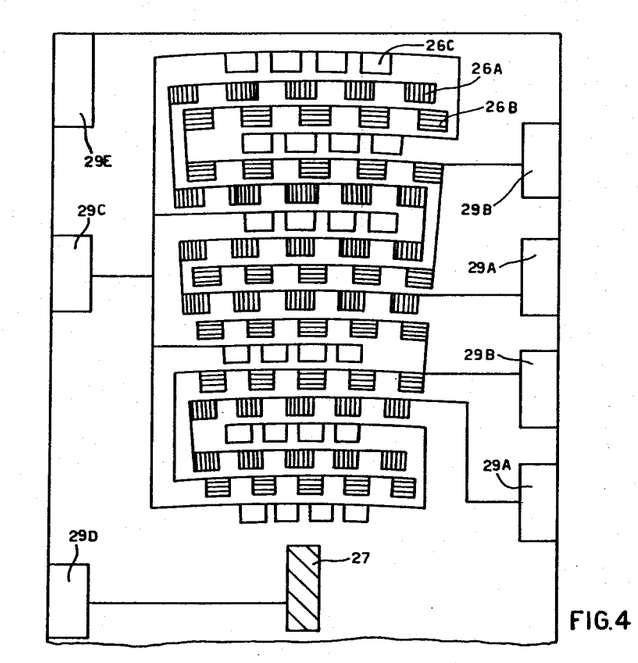
FIG. 4 is a further front view on an enlarged scale showing another part of the transducer shown in FIG. 1.
Figure 6:
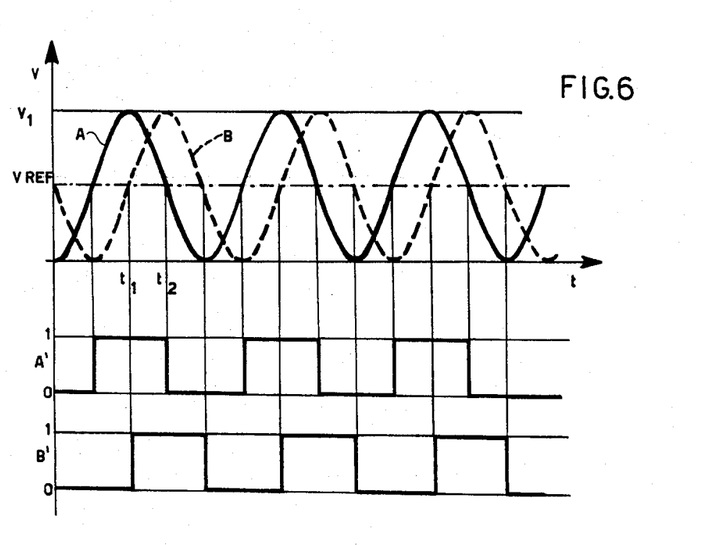
FIG. 6 is a diagram showing some electrical signals of the circuit shown in FIG. 5.

In the particular embodiment described herein, there are eighty four photovoltaic cells 26. They are disposed on a plane which is parallel to the layer 15 of the disc 13 and are subdivided into eighteen rows disposed on circumferences which are all substantially concentric to the axis of rotation of the disc 13. The eighteen rows are equally spaced from each other and are divided into three groups of six. The photovoltaic cells 26 of each group, which are indicated at 26A, 26B and 26C, are electrically connected together in parallel (see FIG. 4) and are capable of generating respective position signals A and B, and a control signal C (see FIG. 6) in the manner which will be described hereinafter. The photovoltaic cells 26 and 27 are produced on a single substrate 28, for example of fused silicon, which represents the common electrode of the various cells. The electrical connections between the cells are made by conducting tracks which are provided on the substrate 28 in any known manner, which is not described herein for the sake of simplicity, during the process of manufacture of the detector 25. In particular, the connecting tracks between the photovoltaic cells 26A (see FIG. 4) terminate at two small square portions 29A of conducting material, to which an electrical wire (not shown) is then soldered in known manner, to connect them in parallel. The connecting tracks as between the cells 26B terminate at two small square conducting portions 29B, which are also connected in parallel by means of another electrical wire. The cells 26C are all connected to a small square portion 29C and the single cell 27 is connected to a small square portion 29D. A further square portion 29E which is common to all the cells 26 and 27 is finally connected to the common base 28.

The photovoltaic cells 26A (FIGS. 2 and 3) which are indicated by vertical hatching are disposed in the second, sixth, eighth, tenth, fourteenth and sixteenth rows from the top, and are aligned with each other in a radial direction to form five columns at a constant pitch equal to the pitch between the regions 18 of the disc 13. The photovoltaic cells 26B which are indicated by horizontal hatching are disposed in the third, fifth, ninth, eleventh, thirteenth and seventeenth rows from the top in the immediate vicinities of the cells 26A. The cells 26B are also aligned in a radial direction to form five columns, and have a constant pitch equal to the pitch between the regions 18 of the disc 13. The columns of cells 26B are also displaced by a quarter of a pitch in a clockwise direction with respect to the columns of the cells 26A. This arrangement provides a constant phase relationship between the six cells of the five columns of cells 26A and 26B and the oppositely disposed regions 18 of the disc 13, which depends exclusively on the position of the shaft 12.

There are four photovoltaic cells 26C in each row, and they are disposed in the first, fourth, seventh, twelfth, fifteenth and eighteenth rows from the top, in a central region between the columns of cells 26A and 26B. The pitch of the cells 26C in a row is three quarters of the pitch between the other cells 26A and 26B. In addition, the extreme left-hand cell 26C in each of the first and eighteenth rows is aligned with a cell 26A; the extreme left-hand cell 26C of each of the fourth and seventh rows is aligned with a cell 26B; and the extreme right-hand cell 26C of the twelfth and fifteenth rows is aligned with a cell 26A. That arrangement gives a constant phase relationship only in respect of a group of cells 26C of various angular sectors and the oppositely disposed regions 18, while the other three groups of six cells 26C are of suitably different phases. In this way, when the disc 13 moves in front of the photodetector element 25, the total surface of the areas of the cells 26C which is illuminated by the light emitted by the light source 26 is substantially constant.

The electrical circuit which includes the photovoltaic cells 26 and 27 (see FIG. 5) is substantially of known type and will be briefly described hereinafter.

Figure 5:
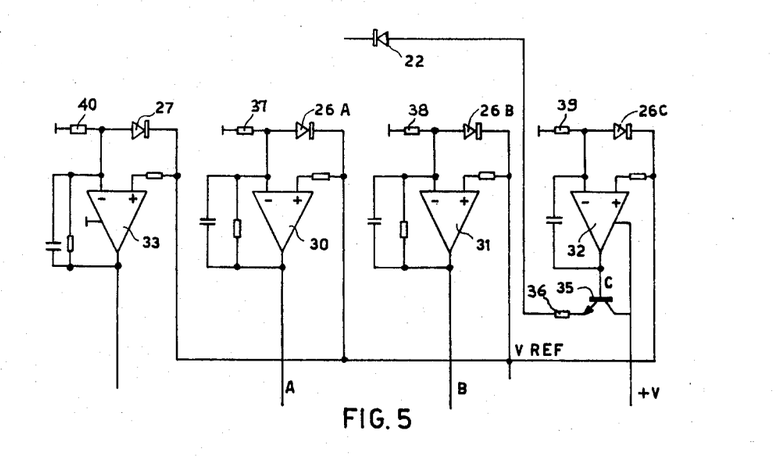
FIG. 5 is a circuit diagram showing the electrical circuit of the transducer according to the invention.

Each group of photovoltaic cells 26A, 26B and 26C, illustrated herein as if they were single circuit components, is connected to the inputs of respective differential amplifiers 30, 31 and 32. The single photovoltaic cell 27 is connected to the inputs of a differential amplifier 33.

The photodiode 22 is supplied, by way of a resistor 36, by a transistor 35 having its collector connected to a constant voltage $+V$ and having its base connected to the output of the amplifier 32. The common electrode of the photovoltaic cells 26A, 26B, 26C and 27, shown herein as that at the cathode, is connected to a reference voltage V REF which represents the mean value of the signals A and B at the outputs of the amplifiers 30 and 31, while the other electrode is connected to earth by way of biasing resistors 37, 38, 39 and 40. When the disc 13 rotates, the signals A and B are sinusoidal (see FIG. 6) with respect to the reference value V REF and go from a minimum close to zero to $+V1$. The signals A and B are also out of phase relative to each other through 90°, just as the photovoltaic cells 26B are out of phase by a quarter of a pitch with respect to the cells 26A. Square signals A' and B' are produced by means of squaring circuits (not shown), and change in value when the signals A and B coincide with V REF.

The mode of operation of the optical transducer 11 described hereinbefore is as follows:

The light beam 40 (see FIGS. 1 and 3) which is emitted by the light source 22 encounters a sector of the disc 13 in such a way as to illuminate a part of the circular ring 17 and an adjacent part in which the synchronisation region 20 lies. The disc operates as a shutter means; the light which passes through the transparent regions 18 of the layer 15 selectively encounters the various photovoltaic cells 26A, 26B and 26C and, in each revolution of the disc 13, the light which passes through the transparent region 20 will impinge on the single photovoltaic cell 27.

While the cells 26A and 26B are alternately illuminated and darkened by the rotary movement of the disc 13, being disposed at the same pitch as the transparent regions 18, the cells 26C are averagely illuminated constantly and generate a signal C which is also substantially constant.

Figure 3:
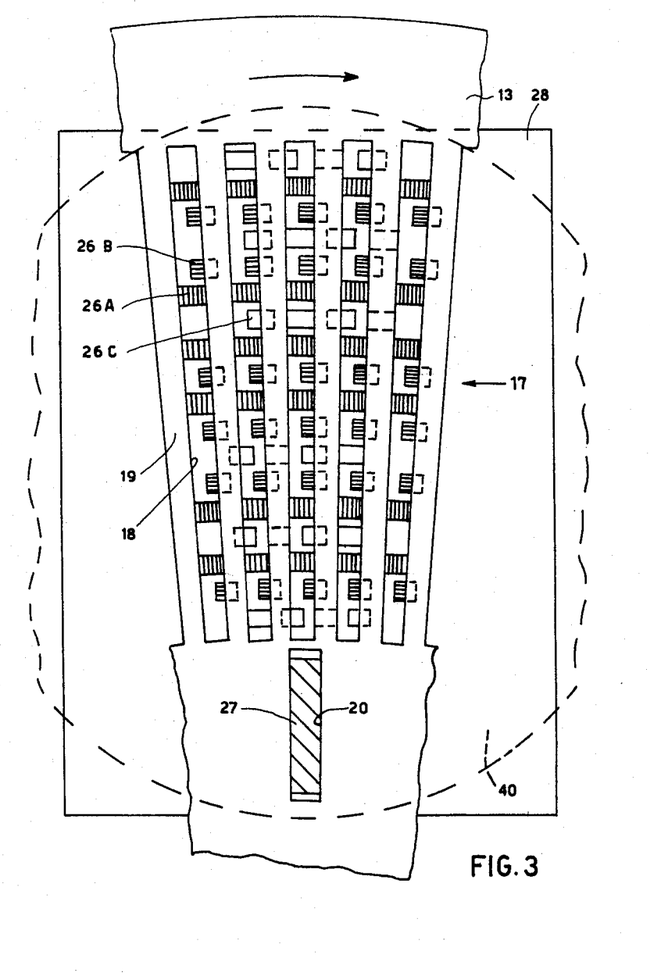
FIG. 3 shows the parts shown in FIG. 2 in a second operating position.

FIG. 3 shows the operating condition wherein the transparent regions 18 are precisely axially in front of the cells 26A and the synchronisation region 20 is in front of the cell 27 which is 100% illuminated, while the cells 26B are 50% illuminated. It may be observed that the cells 26C are also illuminated over 50% of their total area. In that condition (moment t1 in FIG. 6), the signal A is at its maximum, at a voltage V1, and the signal B coincides with the voltage V REF. After a rotary movement through a quarter of a pitch in a clockwise direction (see FIG. 3), the regions 18 are axially in front of the cells 26B which are now 100% illuminated while the cells 26A are 50% illuminated and the cells 26C are still 50% illuminated. In this fresh condition which is not shown in the drawing but which can be easily deduced, the signal 1 (moment t2 in FIG. 6) coincides with the voltage V REF and the signal B is at its maximum, at a voltage V1. After a further rotary movement of a quarter of a pitch in a clockwise direction, the cells 26A are completely obscured and the cells 26B and 26C are 50% illuminated (moment t3). Finally, after a further rotary movement of a quarter of a pitch, the cells 26B are completely obscured and the cells 26A and 26B are 50% illuminated.

The biasing resistors 37, 38 and 39 (see FIG. 5), the gain of the amplifiers 30 or 31 and the resistor 36 are so designed that the photodiode 22 produces a light flux such as to generate at the outputs of the amplifiers 30 and 31, voltages which have a maximum value of V1 and which are symmetrical with respect to the voltage V REF. The result obtained remains absolutely stable in time, depending virtually exclusively on the stability of the passive components, and is not altered by variations in the characteristics of the electrical-optical components used. In fact, any variation in light flux produced by the photodiode 22 is detected by the cells 26C and amplified by the amplifier 32 which, by way of the transistor 35, provides for a correction in the power supply to the photodiode 22 until the response of the photodetectors 26C is re-stabilised, with a different value of current at the photodiode 22.

As the cells 26A, 26B and 26C are spread out over the area on which the light beam 40 is incident and are uniformly mingled, any asymmetry in the light beam 40 has no influence on the corresponding signals generated by the detection cells. In fact, being connected in groups in parallel with each other, the cells generate signals A, B and C which are the sum of the individual signals generated by each thereof. If the mean value of the light flux does not alter, there is no correction in respect of the power supply to the photodiode 22. On the other hand, just by detecting the illumination in each region of the working area, the signals A and B also remain unchanged, both in respect of values and in respect of phases. If, in contrast, a variation in the mean value is ascertained, that variation is corrected and the signals A and B are restored to their original value. The fact that the control detector 26C is disposed adjacent the position detectors 26A and 26B ensures faithful correspondence between the parameters to be measured and corrected and the parameters which are actually detected.

Another major advantage of the transducer according to the invention is that it does not require any individual calibration. In fact, it is sufficient for the detector 25 to have various cells 26A, 26B and 26C of correct dimensions and positions, which can be easily produced in the present state of the art, to ensure a constant response on the part of the complete transducer. Any variation in the characteristics in regard to response to illumination of the photodetector or any drift which may occur is in fact entirely detected and corrected by the cells 26C and the associated circuit in the region in which that occurs.

It will be clear from the description that the means for detecting the light emitted by the light source 22 comprise a multiplicity of sensitive elements 26, each having an area which is a fraction of the area of each transparent region of the disc 13. In addition, the sensitive elements 26 are distributed in a diffuse manner over the area encountered by the light beam generated by the light source, and are connected together in groups 26A, 26B and 26C in order to generate, for each group, a single electrical signal corresponding to the amount of light detected by the photodetector elements on passing the transparent regions 18 of the disc 13.

It will also be clear that one of the electrical signals generated by the cells 26 is capable of providing pilot control for the electrical power supply to the light source, in order to stabilise the signal C and thus the signals A and B.

It will be apparent that modifications and additions of components may be made in the above-described optical transducer, without thereby departing from the scope of the invention.

Figure 7:
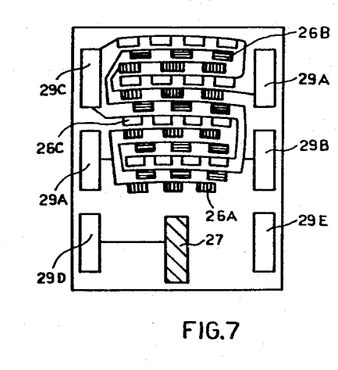
FIG. 7 is an alternative form of the part of the arrangement shown in FIG. 4.

The arrangement of the cells 26 and/or the number thereof may be modified. The diagram shown in FIG. 7 is concerned with a construction having a different arrangement and in which the number of cells in the groups 26A and 26B has been reduced. The number of control cells 26C with equal phases could be reduced, to the benefit of a smaller difference in phase between one group and the other. Even more generally, the transducer may be different from that described by way of example. It may be of linear type and/or may be coupled to the movable member in such a manner that the light is reflected by mirror regions instead of passing through apertures in the shutter member. As another alternative solution, the arrangement could be such that the movement of the movable member is transmitted to the light source-detector assembly instead of to the shutter member. In addition, the diffuse distribution of the sensitive elements may be limited only to one or to the two position sensors and/or the control sensor.

What we claim is:

1. In an optical transducer for detecting the position of a movable member with respect to a fixed structure, comprising light emitting means for generating a light beam; photodetector means associated with said light emitting means and disposed in a region illuminated by said beam for detecting light of said beam and generating an electrical signal proportional to the detected light; and a shutter member interposed between said light emitting means and said photodetector means, and provided with a plurality of light interrupting zones separated by light transmitting zones, each one of said light transmitting zones having predetermined width and height for defining a predetermined light transmitting area; the improvement wherein said photodetector means comprises a plurality of light sensitive elements each one having a light sensitive area which is smaller than the light transmitting area of each one of said light transmitting zones for individually detecting a portion of said light beam, said light sensitive elements being diffusely distributed over the region illuminated by said light beam, and being electrically connected together in order to generate said electrical signal as result of the sum of the plurality of electrical signals individually generated by each one of said light sensitive elements.

2. An optical transducer according to claim 1, wherein each one of said light sensitive elements has a width substantially equal to the width of each one of said light transmitting zones, and has a height smaller than the height of each one of said light transmitting zones.

3. An optical transducer according to claim 1, wherein said shutter member comprises a rotatable disc connected to said movable member, wherein said light emitting means and said photodetector means are mounted on said fixed structure.

4. An optical transducer according to claim 3, wherein said plurality of light sensitive elements are disposed in a plane parallel to said disc and are arranged in a plurality of rows substantially concentric with respect to the axis of rotation of said disc.

5. An optical transducer according to claim 1, wherein each one of said light sensitive elements comprises a photovoltaic cell.

6. An optical transducer according to claim 1, wherein said plurality of light sensitive elements is divided into at least two groups, wherein the light sensitive elements of each one of said groups are electrically connected together for generating an electrical signal, wherein a first group of said light sensitive elements is in a same predetermined phase relationship with respect to the light transmitting zones of said shutter member, and wherein a second group of said light sensitive elements is in another predetermined phase relationship with respect to the light transmitting zones of said shutter member, in such a manner that the electrical signals generated by said two groups are out of phase one with respect to the other.

7. An optical transducer according to claim 6, wherein a third group of light sensitive elements is provided and is diffusely distributed over the region illuminated by said light beam, interposed between the light sensitive elements of the other two groups, and wherein each one of the light sensitive elements of said third group has a phase relationship with respect to the light transmitting zones of said shutter member in such a manner that the sum of the sensitive areas of the light sensitive elements of said third group, illuminated by the light beam passing through said light transmitting zones, is constant.

8. In an optical transducer for detecting the position of a movable member with respect to a fixed structure, comprising a light source for generating a light beam; photodetecting means associated to said light source and disposed in a region illuminated by said light beam for detecting the light emitted by said source; and a shutter member interposed between said light source and said photodetecting means, and provided with a plurality of light interrupting zones separated by light transmitting zones, said photodetecting means comprising a first plurality of light sensitive elements having a predetermined phase relationship with respect to said light transmitting zones for generating an electric signal indicative of the relative movement of said shutter member with respect to said photodetecting means, and a light sensitive means for generating a feed-back signal for said light source, the improvement wherein said light sensitive means comprises a second plurality of light sensitive elements, each one having a predetermined sensitive area, the light sensitive elements of said second plurality being diffusely distributed over said region illuminated by said light beam passing through said light transmitting zones, and being interposed among the light sensitive elements of said first plurality.

9. An optical transducer according to claim 8, wherein each one of said light transmitting zones has predetermined width and height for defining a predetermined light transmitting area, and wherein each sensitive area of said second plurality of light sensitive elements is smaller than said light transmitting area.

10. An optical transducer according to claim 8, wherein each light sensitive element of said second plurality has a proper phase relationship with respect to said light transmitting zones, in such a manner that the sum of the sensitive areas of said second plurality of light sensitive elements, illuminated by the light beam passing through said light transmitting zones, is constant, irrespective of the relative position of said shutter member with respect to said photodetecting means.

11. An optical transducer according to claim 8, wherein the outputs of the light sensitive elements of said second plurality are electrically connected together, for generating said feed-back signal.

12. In an optical transducer for detecting the position of a movable member with respect to a fixed structure, comprising a light source for generating a light beam; photodetecting means associated with said light source and disposed in a region illuminated by said light beam for detecting the light emitted by said source; and a shutter member interposed between said light source and said photodetecting means, and provided with a plurality of light interrupting zones separated by light transmitting zones; said photodetecting means comprising a first plurality of light sensitive elements having a predetermined phase relationship with respect to said light transmitting zones for generating an electric signal indicative of the relative movement of said shutter member with respect to said photodetecting means; the improvement wherein said photodetecting means further comprises a second plurality of light sensitive elements, each one having a predetermined sensitive area, said second plurality of light sensitive elements being diffusely distributed over said region illuminated by said light beam, and being interposed among the light sensitive elements of said first plurality, each light sensitive element of said second plurality having a proper phase relationship with respect to said light transmitting zones, in such manner that the sum of the sensitive areas of said second plurality of light sensitive elements illuminated by the light beam passing through said light transmitting zones is constant irrespective of the relative position of said shutter member with respect to said photodetecting means, the light sensitive elements of said second plurality being electrically connected together for generating an electrical feed-back signal for said light source.

13. In an optical transducer for detecting the angular position of a rotatable member with respect to a fixed structure, comprising a disc connected to said rotatable member and provided with a plurality of radial light interrupting zones separated by radial light transmitting zones each one having predetermined width and height for defining a predetermined light transmitting area; a light source for generating a light beam directed towards said disc; and photodetecting means associated with said light source for detecting the light of said beam which passes through said light transmitting zones of said disc and generating an electrical signal proportional to the detected light; the improvement wherein said photodetecting means comprises a plurality of light sensitive elements each one having a light sensitive area which is smaller than the light transmitting area of each one of said light transmitting zones for individually detecting a portion of said light beam, said light sensitive elements being diffusely distributed over the region illuminated by said light beam, and being electrically connected together in order to generate said electrical signal as result of the sum of the plurality of electrical signals individually generated by each one of said light sensitive elements.

* * * * *